Patented July 21, 1936

2,048,174

UNITED STATES PATENT OFFICE 2,048,174

WELDING ROD

John B. Austin, Cleveland Heights, and George Edwin Durham, Shaker Heights, Ohio, assignors to Una Welding, Incorporated, East Cleveland, Ohio, a corporation of Delaware No Drawing. Application June 11, 1934, Serial No. 730,062

8 Claims. (Cl. 219—8)

Our invention relates to the art of welding, and more particularly to ferrous welding electrodes containing a substantial amount of chromium or chromium and nickel.

In welding chromium steels or chromium steels containing nickel, attempts have been made to utilize a bare rod having a composition approximately similar to the metal to be welded. The welding properties of such electrodes, however, are very unsatisfactory because of the rapid oxidation of the chromium in the arc. As a result, the arc is unstable and the deposited metal is very porous, the porosity extending throughout the weld.

An object of our invention is to provide a coating for chromium and chromium nickel alloy electrodes that produce substantially non-porous welds.

Another object of our invention is to provide a coated ferrous welding electrode containing chromium, or chromium and nickel, that has excellent flowing properties and that forms a slag during the welding operation, and which is capable of dissolving oxidation products of chromium that may be formed.

A still further object of our invention is to provide a coated ferrous-base welding electrode containing chromium, or chromium and nickel, which is particularly adapted for welding pieces of so-called stainless steel or for building up worn surfaces containing such steel, the coating being capable of reducing the oxidation of the base rod or dissolving oxides of chromium that may be formed, without increasing the carbon content of the weld.

An additional object of our invention is to provide a coated ferrous welding electrode containing chromium, or chromium and nickel steels, which forms a slag during welding operation, which has a different co-efficient of expansion than the deposited weld metal so that the slag may be readily removed after the welding operation has been completed.

An important object is to provide a coating that will protect the molten metal passing through the arc so as to minimize loss of chromium and nickel from the metal during such passage.

In summary, we have provided a coated steel welding electrode comprising a rod of substantially the same composition as the metal to be welded, having a substantially carbon-free coating associated therewith, said electrode being characterized by having good flowing properties, excellent arc characteristics, and which is capable of reducing the oxidation of the metal ingredients of the rod, protecting the molten metal as it passes through the arc to minimize loss of chromium and nickel, and dissolving any oxidation products of chromium that may be formed during the welding process, whereby a relatively non-porous weld of the desired characteristics is obtained.

To illustrate the objects above set forth, the frequently used "18-8" stainless steel alloy may be referred to. This alloy contains approximately 18% chromium and 8% nickel with a maximum carbon content of about .07%. In welding such metal the electrode used is generally of the same composition as the plate. Furthermore, to obtain the maximum corrosion resisting qualities, it is essential that the carbon content of the deposited weld metal should not exceed that of the plate material, lest the deposited metal have a higher carbon content than the parent metal. As carbon in the weld metal permits corrosion if its percentage in the "as-welded" condition exceeds the original .07%, a high rate of corrosion is likely to result. It is also obviously essential that the metal be transferred from the rod to the plate without great loss of chromium or nickel, which can occur, for example, through oxidation of these elements. The invention is designed to provide a coating that will add no carbon to the deposited metal, and will also protect the chromium and nickel content of the base rod from oxidation or the like during its passage in the arc. Other desirable qualities such as arc stabilization may also be obtained by adding suitable elements to the rod and coating, as will hereinafter be described.

As a base rod for our electrode, we preferably employ a ferrous-base chromium steel or a ferrous-base chromium-nickel steel. As noted, it is generally desirable that it have substantially the same composition as the metal to be welded, so that the resulting weld may be of the same character as the parent metal. These steels are variously known as stainless steels, or steels having high resistance to oxidation at high temperatures, and my invention is applicable to all such steels.

Generally stated, our improved coating comprises one or more ingredients that are capable of reducing the oxidation of the metals of the base rod and dissolving any oxides of chromium or nickel that may be formed, but without the addition of carbon to the weld, and one or more ingredients capable of increasing the fluidity of the slag and providing good arc characteristics.

The coating constituents are preferably in finely divided comminuted form, such as 100 mesh or finer, and are uniformly associated with the rod throughout its length by means of a binder, such as sodium silicate, or the like.

We have found that the fluorides of the alkali or alkaline earth metals, in general, and particularly calcium and sodium fluorides, are good solvents for the oxides of chromium and are especially valuable as a coating constituent for ferrous-base rods containing chromium, or chromium and nickel, because of their comparatively high melting points; although other ingredients may be employed. A coating containing a considerable proportion of calcium fluoride has been found to be very satisfactory, because calcium fluoride increases the fluidity of the slag in addition to providing a good solvent for oxides of chromium that may be formed.

The above mentioned solvents were very satisfactory in dissolving out the oxides in the metal. In some cases it has been found to be desirable to add magnesium powder to the coating since this element will completely remove any traces of oxides that might remain in the weld metal after the action of the first named solvents.

In welding it is desirable to have a smooth steady arc, and a slag that is free flowing and that completely covers the weld metal. The desirability of a free steady arc is obvious; and provision of a free flowing slag that covers the weld metal provides means that readily includes or encases all of the molten part of the weld, and protects it from the effects of the air. It is also desirable that the slag have a different co-efficient of expansion from that of the deposited weld metal so that in temperature changes, notably cooling of the deposited substances, the slag may be easily removed from the deposits. It has been found that by adding suitable proportions of calcium carbonate, silica and rhodochrosite, a smooth, steady arc, and a free flowing slag having a different co-efficient of expansion from the weld metal are provided. In addition to the above, these elements provide a diluent for the fluoride since the fluoride emits undesirable fumes when heated. It is very advantageous to have some means to dilute the fumes and thereby reduce their effect. While silica and calcium carbonate are especially valuable in this application, magnesium carbonate, barium carbonate, calcium silicate and the like may be employed.

A sufficient amount of the coating is usually applied to the base rod so that the weight of the coating when wet is approximately 10-22% of the total weight of the electrode. Of course, the quantity of the coating varies materially with the conditions of the welding operation. In my preferred coating the fluorides are present in amounts ranging from 3.50% to 6.25% of the total weight of the completed electrode, when the particular fluoride used is calcium fluoride: calcium carbonate is present in amount ranging from 5.40% to 9.00% of the total weight of the electrode; the silica range is from .90% to 1.50% of the total weight; the rhodochrosite range is from 1.35% to 2.25% of the total weight; the sodium silicate range is from 2.90% to 4.90% of the weight; and the magnesium is present in range from .18% to .30% of the weight of the completed electrode. All the above are based on the weight of the coating when wet. While the above proportions represent the present composition, it will be understood that the relative proportions may be varied within wide ranges. As it has heretofore been pointed out some of the elements may be eliminated without destroying the ability of the rod to function. For instance, the rod will operate where all the ingredients are eliminated except the calcium fluoride and some suitable binder to make the fluoride adhere to the base rod. Obviously with the elimination of all other elements or with the addition of the elements individually, each being added to include its particular attribute, the relative percentages of the elements are capable of a very wide variation.

In the above described coating sodium silicate has been noted as part of the composition. This compound is illustrative of binders that may be used for causing the coating to cohere and to adhere to the base rod. Other binders may be used, preferably of an inorganic type that is substantially free from carbon. It will be observed that sodium silicate fulfills these desired characteristics of being inorganic and free from carbon. In applying the binder to the base rod a paste or suspension may be made of the coating, and the paste applied to the rod in any of the usual ways. With this particular rod it has been found that better results are obtained by extruding the coating onto the rod, since by this method a more uniform coating results.

To illustrate by a specific example the advantageous features of my electrode a coating of the following composition was prepared:

| | Per cent |
|---|---|
| Calcium carbonate | 35.85 |
| Calcium fluoride | 23.95 |
| Silica | 5.97 |
| Rhodochrosite | 8.98 |
| Magnesium powder | 1.21 |
| Sodium silicate | 19.45 |
| Water | 4.59 |

It will be obvious that the percentage of water may be altered materially by changing the degree of dryness of the rod.

Coating of the above composition was applied to a base rod of "18-8" chromium-nickel composition. The base rod was coated with the coating material as above described, and melted in an electric arc. It was found to melt uniformly, the coating following the melting rate of the base rod. The slag was very liquid and appeared almost to entirely surround every particle of metal as it left the electrode tip. This slag was particularly effective in dissolving any chromium oxide formed, and being very light and liquid it flowed to the surface of the deposited metal, and by virtue of its co-efficient of expansion it was readily removed after the weld had cooled.

Thus by the use of our improved coating the oxidation of the chromium or chromium and nickel deposited has been very effectively prevented, and at the same time, the carbon content of the metal is not only advantageous, but also practically essential, because as heretofore noted, excessive carbon in stainless steels makes them subject to corrosive action in the "as-welded" condition.

From the foregoing specification it will be seen that we have provided an improved welding electrode for welding stainless steel and one which is effective in producing a fine grain structure that is substantially non-porous, and is comparatively free from carbon and oxides of chromium.

We claim:

1. A welding electrode substantially free of carbonaceous material comprising a base rod containing a substantial amount of chromium and a coating material therefor, said coating including a fluoride in such proportions as to prevent oxidation of the chromium, and a sufficient proportion of metallic deoxidizer to remove traces of oxides.

2. A coated welding rod as set out in claim 1 in which the fluoride is calcium fluoride.

3. A welding electrode substantially free of carbonaceous material comprising a base rod containing a substantial amount of chromium and a coating material associated therewith including a fluoride in such proportions as to act as a deoxidizer for the chromium in the weld, and said coating including means to produce a free-flowing slag.

4. A welding electrode substantially free of carbonaceous material comprising a substantial amount of chromium and a coating material associated therewith including a fluoride in such proportions as to prevent oxidation of the chromium in the weld, means for producing a free flowing slag, and means for stabilizing the arc.

5. A weld rod comprising a base rod containing a substantial amount of chromium and a coating associated therewith including a fluoride in amount ranging from 3.50% to 6.25%, by weight of the coating.

6. A weld rod as set out in claim 5 in which the coating also includes calcium carbonate in the range of from 5.40% to 9.00% by weight of the total weight of the electrode.

7. The weld rod as set out in claim 5 wherein the coating includes magnesium in percentages from .18% to .30% of the weight of the total electrode.

8. A weld rod comprising a base rod, a coating therefor containing the following constituents in percentages of the total weight of the rod: a fluoride, 3.50–6.25%; calcium carbonate 5.40–9.00%; silica .90–1.50%; rhodochrosite 1.35–2.25%; sodium silicate 2.90–4.90%, and magnesium .18–.30%.

JOHN B. AUSTIN.
GEORGE EDWIN DURHAM.